(No Model.) 2 Sheets—Sheet 1.

A. M. LORYEA & C. H. PALMER.
DYNAMO ELECTRIC MACHINE.

No. 283,498. Patented Aug. 21, 1883.

Attest:
Conf. A. Cooper.
Josephine Campbell.

A. M. Loryea
C. H. Palmer
Inventors:
per
Foster & Freeman
Attys (No Model.) 2 Sheets—Sheet 2.

A. M. LORYEA & C. H. PALMER.
DYNAMO ELECTRIC MACHINE.

No. 283,498. Patented Aug. 21, 1883.

Attest:
Cnut. A. Cooper.
Josephine Campbell.

Inventors:
A. M. Loryea
C. H. Palmer
by Foster & Freeman
Attys

UNITED STATES PATENT OFFICE.

ABRAM M. LORYEA AND CHARLES H. PALMER, OF NEW YORK, N. Y.

DYNAMO-ELECTRIC MACHINE.

SPECIFICATION forming part of Letters Patent No. 283,498, dated August 21, 1883.

Application filed May 31, 1883. (No model.) Patented in England May 8, 1883.

*To all whom it may concern:*

Be it known that we, ABRAM M. LORYEA and CHARLES H. PALMER, both of the city, county, and State of New York, have invented certain Improvements in Dynamo-Electric Machines, of which the following is a specification.

This invention relates to improvements in the construction of the inducing or field magnets for dynamo-electric machines, and has for its object to simplify and cheapen such construction, as well as to increase the efficiency of such machines.

This case is filed as a division of our application, No. 73,412, filed October 4, 1882.

The inducing or field magnets we make of two or more similar cast pieces of iron bolted together at the neutral parts of the system, and form at these junctions the bearings for the journals of the armature-shaft, one section of each bearing being in each of the similar cast-iron pieces. The armature, secured on its shaft, is placed between the castings before they are bolted together, and polar projections on the central parts of the castings surround the armature. This construction and arrangement, which virtually constitute the principal working parts of the machine, insure perfect rigidity to the bearings of the armature-shaft, which shaft is driven by means of a pulley secured to one of its ends projecting beyond the bearing. To compensate for the side wear of the bearings, due to the tension of the driving-belt on the pulley, we provide means by which different parts of the bearings may from time to time be brought opposite such strain, so that all the surface of the bearings shall be equally worn. To this end the magnet-frame is constructed so as to be set on its bed or bearings in different positions. One mode is by supplying it with a series of radial supports; or journals are formed projecting from the joined ends of the two field-magnet castings, concentric with the bearing of the armature-shaft and fitted in fixed standard-bearings to allow the field-magnets to be rotated and set in any desired position.

To describe our invention more particularly, we will now refer to the accompanying drawings, in which—

Figure 1:
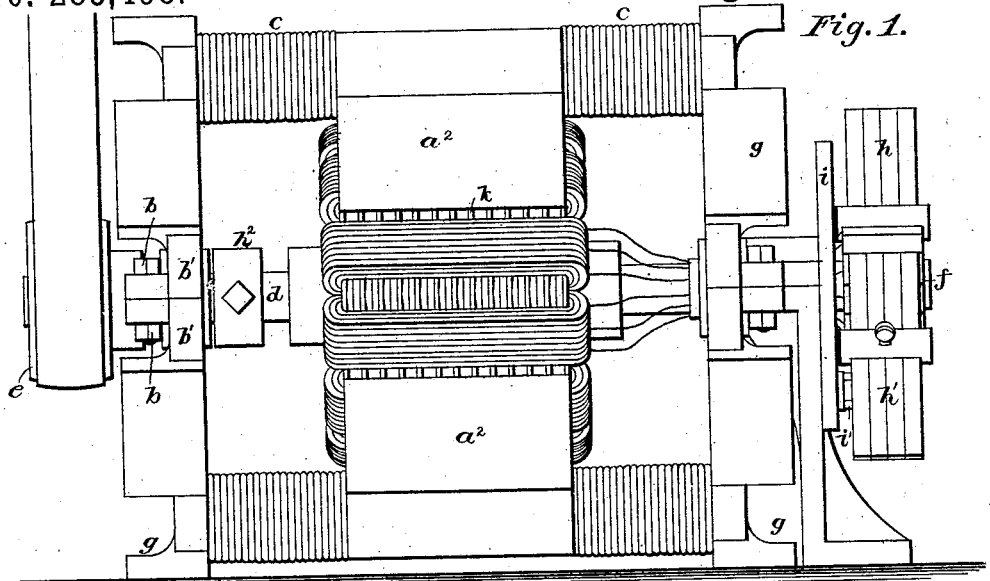
Figure 3:
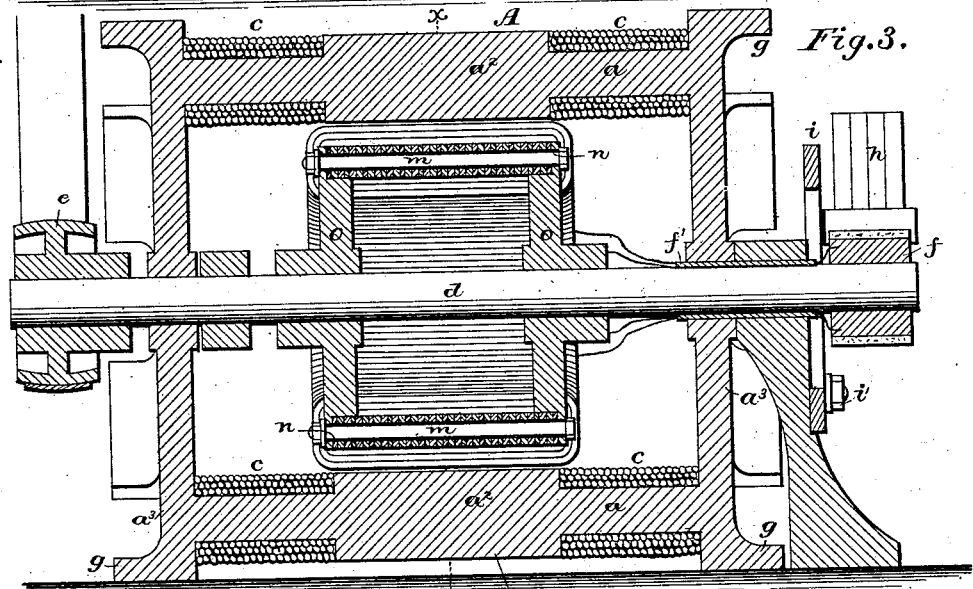
Figure 5:
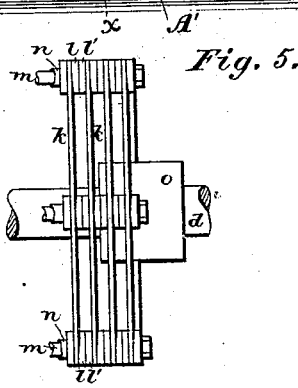
Figure 2:
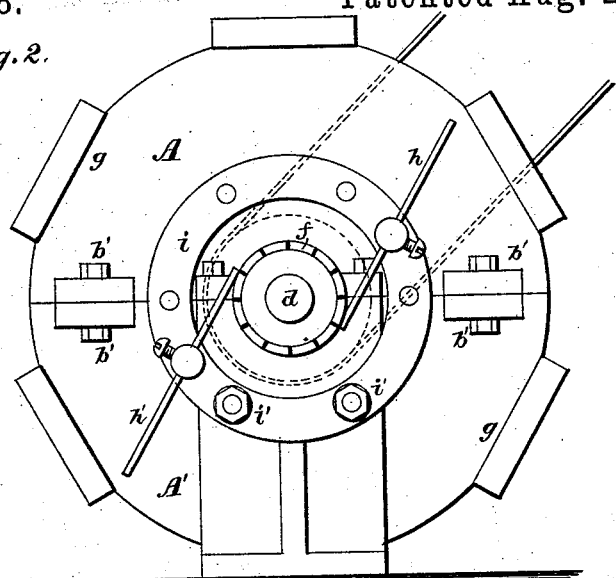
Figure 4:
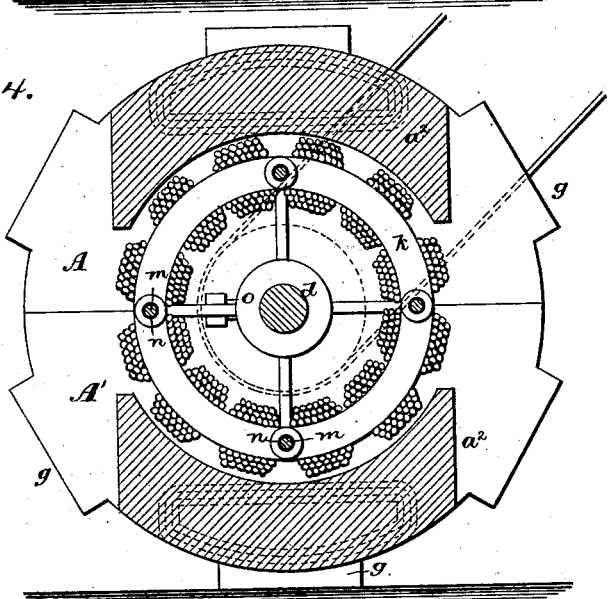
Figure 6:
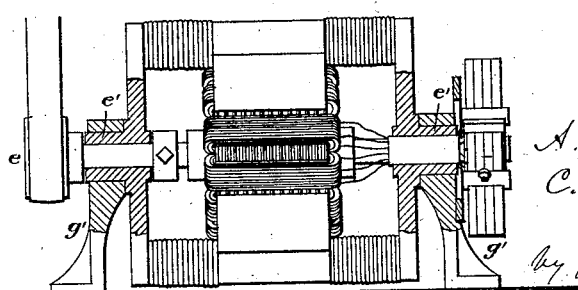

Figure 1 is a front elevation. Fig. 2 is an end elevation. Fig. 3 is a longitudinal section. Fig. 4 is a transverse section cut on the line $x\ x$. Fig. 5 is an enlarged detached view of a portion of the armature. Fig. 6 is a side elevation of the machine, showing another manner of supporting it.

The whole frame is composed of two or more sections, A A', each of which consists of one piece of cast metal, comprising the end semicircular disks, $a^3$, the connecting field-magnet bars $a$, and the polar extension $a^2$. The semicircular disks are provided at their meeting edges with coinciding ears $b'\ b'$, through which are passed connecting-bolts $b\ b$. The coils $c$, of insulating-wire, which with the frame constitute the field-magnets, are wound upon the portions $a$. The armature-shaft $d$ is fitted to rotate in bearings formed at the junction of the two similar casings, A and A'. One of its projecting ends is provided with the driving-pulley $e$, and the other with the commutator $f$, the plates of which are connected to the armature by means of wires passing under the sleeve $f'$ of the bearing in the ordinary manner. The frame thus constructed is bolted or attached to a suitable supporting-plate, a convenient means consisting of feet or ears $g$ upon the disks $a^3$, near the peripheries, as shown in Figs. 1 to 4, and these feet may be arranged at intervals around the peripheries, so that the frame may be turned and set with any part uppermost. By this arrangement it will be seen that the bearings of the armature are very rigid, so that the armature is maintained in constant position in the magnetic field, and that the frame may be turned around to present any side of said bearings to the side of the shaft bearing with the greatest pressure, due to the tension of the driving-belt, on the pulley $e$.

The collecting-brushes $h\ h'$ are carried by the ring $i$, secured to the frame or to standard-bearings $g'$ by the bolts $i'\ i'$. The relative position of the brushes and that of the magnetic poles may be regulated by turning the magnets $a\ a'$ on their supporting-bearings, the brushes being permanently held in position during such regulation. A series of holes are provided in the ring $i$, by any adjoining two of which it may be held by the bolts $i'\, i'$ to the standard.

$h^2$ represents a collar for preventing any play of the shaft $d$ in its bearing. The shaft may be shouldered at its journals for this purpose, if desired.

The construction of the armature is more clearly shown at Fig. 5, in which and the other views the thin flat iron rings $k\, k$ are shown separated by means of washers composed of paper-board or other similar material, $l$, and felt $l'$. We apply the felt in this manner to prevent conduction of heat from one plate to another, it being particularly well adapted for this purpose, and the paper-board part of the washers gives stability to the same; at the same time they insure perfect electrical insulation between the rings.

The binding-rods $m$, which clamp and hold the rings and washers together, are placed inside of a tube, $n$, of paper or other insulating material, so that they in no wise interfere with the perfect insulation of the rings $k\, k$. The cylindrical armature composed of the rings and washers is secured to the shaft $d$ by means of the spider-arms $o\, o$. It may be wound with wire, as shown, on the Gramme principle, or any other known principle.

The end disks or plates, $a^3$, may be made any shape desired, provided there is means for securing the similar cast pieces together to form a frame with sectional bearings for the journals of the armature-shaft.

An adjustment of the frame similar to that described may be effected by supporting the same so as to turn in standards $g'\, g'$. Thus each section of the frame may be cast with a semi-tubular extension, $e'$, which, with the similar extension of the other section, constitutes a tubular trunnion adapted to a bearing in the adjacent standard $g'$, so that the frame may be rotated on said trunnions, while the shaft $b$ passes through and turns in the trunnions as bearings. In such case, also, the shaft and armature may be stationary and the frame revolve.

It is obvious that the frame of the machine may be in four or more like sections, it being requisite only that each section shall embody a part of the bearing for the armature-shaft.

What we claim, and desire to secure by Letters Patent, is—

1. The field-magnets of a dynamo-machine, consisting of two or more like sections of magnetic material connected detachably, each constructed to form a portion of the bearings for the armature-shaft, substantially as described.

2. The field-magnets of a dynamo-electric machine, composed of only two pieces of magnetic metal, secured together at the neutral parts of the system, in combination with an armature whose shaft rotates in bearings formed at the junction of said two pieces, substantially as and for the purpose set forth.

3. A field-magnet for dynamo-machines, provided with supports constructed and arranged to permit attachment to the bed at different points, whereby different sides may be brought uppermost, for the purpose specified.

In testimony whereof we have signed our names to this specification in the presence of two subscribing witnesses.

ABRAM M. LORYEA.
CHARLES H. PALMER.

Witnesses:
H. D. WILLIAMS,
JAS. J. SHEDLOCK.